US009232065B1

(12) United States Patent
Gargi et al.

(10) Patent No.: US 9,232,065 B1
(45) Date of Patent: Jan. 5, 2016

(54) GROUP PSEUDO-PROFILES FOR ONLINE SESSIONS (71) Applicant: Google Inc., Mountain View, CA (US)

(72) Inventors: Ullas Gargi, Sunnyvale, CA (US); Nisarg Dilipkumar Kothari, Sunnyvale, CA (US); Nicholas Delmonico Rizzolo, Cupertino, CA (US)

(73) Assignee: Google Inc., Mountain View, CA (US)

( * ) Notice: Subject to any disclaimer, the term of this patent is extended or adjusted under 35 U.S.C. 154(b) by 414 days.

(21) Appl. No.: 13/653,750

(22) Filed: Oct. 17, 2012

(51) Int. Cl.
G06F 15/16 (2006.01)
H04M 3/51 (2006.01)
H04L 9/08 (2006.01)
H04L 29/00 (2006.01)

(52) U.S. Cl.
CPC ............ H04M 3/5191 (2013.01); H04L 9/0833 (2013.01); H04L 29/00 (2013.01)

(58) Field of Classification Search
CPC .................................................... H04M 3/5191
USPC ............................................................ 709/204
See application file for complete search history.

(56) References Cited

U.S. PATENT DOCUMENTS

| 6,327,590 | B1 | 12/2001 | Chidlovskii et al. |
| 6,839,680 | B1 | 1/2005 | Liu et al. |
| 8,079,042 | B2 | 12/2011 | Foti et al. |
| 2004/0111423 | A1 | 6/2004 | Irving et al. |
| 2009/0192865 | A1 | 7/2009 | Zoza et al. |
| 2010/0050202 | A1* | 2/2010 | Kandekar ......... G06F 17/30244 725/14 |
| 2010/0223105 | A1 | 9/2010 | Gassewitz et al. |
| 2011/0238670 | A1* | 9/2011 | Mercuri ............. G06Q 30/0282 707/748 |

* cited by examiner

Primary Examiner — Jude Jean Gilles
Assistant Examiner — Jaren M Means
(74) Attorney, Agent, or Firm — Remarck Law Group PLC (57) ABSTRACT A method, computer program product, and system is described. A group including a plurality of individuals is defined based upon, at least in part, participation of the plurality of individuals in one or more consumption sessions. A group profile is designated for the group. Consumption of a first item of content by a portion of the group during a consumption session participated in by at least the portion of the group is identified. An indicator associated with the first item of content consumed by the portion of the group during the consumption session is associated with the group profile. A recommendation of a second item of content is provided to one or more members of the group, wherein the recommendation is based upon, at least in part, associating with the group profile the indicator associated with the first item of content.

20 Claims, 4 Drawing Sheets

GROUP PSEUDO-PROFILES FOR ONLINE SESSIONS

TECHNICAL FIELD

This disclosure relates to online group interactions.

BACKGROUND

Communication technology may facilitate online sessions of communication and media consumption that include multiple individuals using multiple computing devices. For example, a group of individuals may collectively participate in an online session in which one group member participates through her laptop, another member participates using a mobile computing device, and another member participates through his desktop computer. In such a session, through the use of a virtual "meeting room" (or other mechanism or functionality) the group members may each simultaneously (or nearly simultaneously) view the same video, listen to the same music segment, read the same article, and so on, although they may be physically located in different places. In addition to consuming various types of online (and/or offline) content, group members may also sometimes communicate with each other, via the virtual meeting room (or other mechanism or functionality), by text, by voice, by video chat and so on. In this way, individuals who may not be able to meet in person at a given time may nonetheless participate in group consumption of media and discussion of that media (and other topics) via various network-connected computing devices.

BRIEF SUMMARY OF THE DISCLOSURE

According to one aspect of the disclosure, a computer-implemented method includes defining, by one or more computing devices, a group including a plurality of individuals, based upon, at least in part, participation of the plurality of individuals in a plurality of synchronous consumption sessions. The method further includes designating, by the one or more computing devices, a group profile for the group. The method further includes identifying, by the one or more computing devices, consumption of a first item of content by a portion of the group during a synchronous consumption session participated in by the portion of the first group. The first item of content includes one or more of a first video, a first audio segment, a first text passage, a first website, a first image, and a first multimedia presentation. The method further includes associating with the group profile, by the one or more computing devices, an indicator associated with first the item of content, wherein associating the indicator with the group profile is based upon, at least in part, consumption of the first item of content by the portion of the group. The method further includes providing to one or more members of the first group, by the one or more computing devices, a recommendation of a second item of content. The second item of content includes one or more of a second video, a second audio segment, a second text passage, a second website, a second image, and a second multimedia presentation. The recommendation is based upon, at least in part, associating with the group profile the indicator associated with the first item of content.

According to another aspect of the disclosure, a computer-implemented method includes defining, by one or more computing devices, a first group including a plurality of individuals, based upon, at least in part, participation of the plurality of individuals in one or more consumption sessions. The method further includes designating, by the one or more computing devices, a first group profile for the first group. The method further includes identifying, by the one or more computing devices, consumption of a first item of content by a portion of the first group during a first consumption session participated in by at least the portion of the first group. The method further includes associating with the first group profile, by the one or more computing devices, a first indicator associated with the first item of content consumed by the portion of the first group during the first consumption session. The method further includes providing to one or more members of the first group, by the one or more computing devices, a recommendation of a second item of content, wherein the recommendation is based upon, at least in part, associating with the first group profile the first indicator associated with the first item of content.

One or more of the following features may be included. The first consumption session may be a synchronous consumption session including multiple members of the first group. The first indicator may be associated with the first group profile based upon, at least in part, a quorum of members of the first group participating in the synchronous consumption session. Associating the first indicator with the first group profile may include associating one or more tags associated with the first group and the first item of content with a profile of a member of the first group. Designating the first group profile for the first group may include combining a portion of a second group profile and a portion of a third group profile. Combining the portion of a second group profile and the portion of a third group profile may include combining a portion of a set of content indicators associated with the second group profile and a portion of a set of content indicators associated with the third group profile. The method may include associating with the first group profile a second indicator associated with a second item of content wherein associating the second indicator with the first group profile is based upon, at least in part, a selection of the second item of content, by a member of the first group, for association with the group profile. The method may further include defining the first group based upon, at least in part, participation of the plurality of individuals in a plurality of consumption sessions.

According to another aspect of the disclosure, a computer program product resides on a computer readable storage medium and has a plurality of instructions stored on it. When executed by a processor, the instructions cause the processor to perform operations including defining a first group including a plurality of individuals, based upon, at least in part, participation of the plurality of individuals in one or more consumption sessions. The operations further include designating a first group profile for the first group. The operations further include identifying consumption of a first item of content by a portion of the first group during a first consumption session participated in by at least the portion of the first group. The operations further include associating with the first group profile a first indicator associated with the first item of content consumed by the portion of the first group during the first consumption session. The operations further include providing to one or more members of the first group a recommendation of a second item of content, wherein the recommendation is based upon, at least in part, associating with the first group profile the first indicator associated with the first item of content.

One or more of the following features may be included. The first consumption session may be a synchronous consumption session including multiple members of the first group. The first indicator may be associated with the first group profile based upon, at least in part, a quorum of members of the first group participating in the synchronous consumption session. Associating the first indicator with the first group profile may include associating one or more tags associated with the first group and the first item of content with a profile of a member of the first group. Designating the first group profile for the first group may include combining a portion of a second group profile and a portion of a third group profile. Combining the portion of a second group profile and the portion of a third group profile may include combining a portion of a set of content indicators associated with the second group profile and a portion of a set of content indicators associated with the third group profile. The operations may further include associating with the first group profile a second indicator associated with a second item of content wherein associating the second indicator with the first group profile is based upon, at least in part, a selection of the second item of content, by a member of the first group, for association with the group profile. The operations may further include defining the first group based upon, at least in part, participation of the plurality of individuals in a plurality of consumption sessions.

One or more of the first item of content and the second item of content may include a video segment. One or more of the first item of content and the second item of content may include an audio segment. One or more of the first item of content and the second item of content may include text content.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

As noted above, multiple individuals may sometimes engage in consumption of various types of online content in synchronous (or near-synchronous) online consumption and communication sessions (referred to generally herein as "consumption sessions"). (It will be understood that references to "synchronous" or "real-time" herein may indicate actual synchronous or real-time occurrence of the described function, process, method, and so on, or may indicate near-synchronous or near-real-time occurrence of the described function, process, method, and so on.) For example, multiple individuals may connect, using multiple devices, to an online session in which the individuals are able to communicate by voice, text, video chat and so on while also consuming various types of online content, including videos, music, web pages, text content, images, multimedia presentations, and so on.

Based on the participation of the same group (or similar groups) of individuals in one or more consumption sessions it may be useful to designate for the group a pseudo-profile (also referred to herein as a "profile"), through which the consumption history of the group (and/or its individual members) may inform recommendations for the group (and/or its individual members) regarding additional online media in which the group may be interested.

In order to facilitate such recommendations, a group profile ("GP") process may define a group based on a variety of factors. For example, a GP process may define a group based on explicit designations by group members or a group administrator. In certain embodiments, a GP process may define a group to include certain individuals who have participated in one or more of the same consumption sessions. A GP process may associate a group profile with that group and may further identify consumption of content by the group (and/or its individual members) during consumption sessions. A GP process may then associate such consumption with the group profile by, for example, associating with the group profile an indicator relating to the content consumed by the group (and/or individual members thereof). In certain embodiments such an indicator may include information regarding one or more ratings associated with the content by one or more of the group members (or the group as a whole).

Accordingly, in some embodiments the GP process may associate a group profile with a group of users based on the users in the group being involved in one or more consumption sessions with each other. During the consumption sessions the users may all consume the same content item. The GP process may associate an indicator of the content that was consumed in the one or more consumption sessions with the group profile.

A GP process may utilize the group profile to provide recommendations to the group (and/or its individual members) of additional online content for consumption by the group and/or one or more users included within the group. Such recommendations may be based, for example, on associating with the group profile one or more indicators relating to past consumption of online content. In this way, a GP process may leverage prior consumption of various online content by a group (and/or its individual members) into recommendations of additional content that the group (and/or its individual members) may be likely to enjoy.

A GP process may operate as part of a content consumption application ("CCA") or a CCA may operate as part of or in conjunction with a GP process. A CCA may include an application through which one or more individuals may access and consume (e.g., view, listen to, edit, comment on, and so on) online (and/or offline) content. In some embodiments a CCA may include (or may be included in or operate in conjunction with) an application that facilitates interaction among multiple individuals. For example, a CCA may include (or may operate in conjunction with an application that includes) forum functionality through which individuals may consume online content in a synchronous (or near-synchronous) fashion and/or may interact with each other through text, voice, video chat and other exchanges. A CCA may facilitate text, voice, video chat and other interactions during the consumption of content and/or when no content is being consumed.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
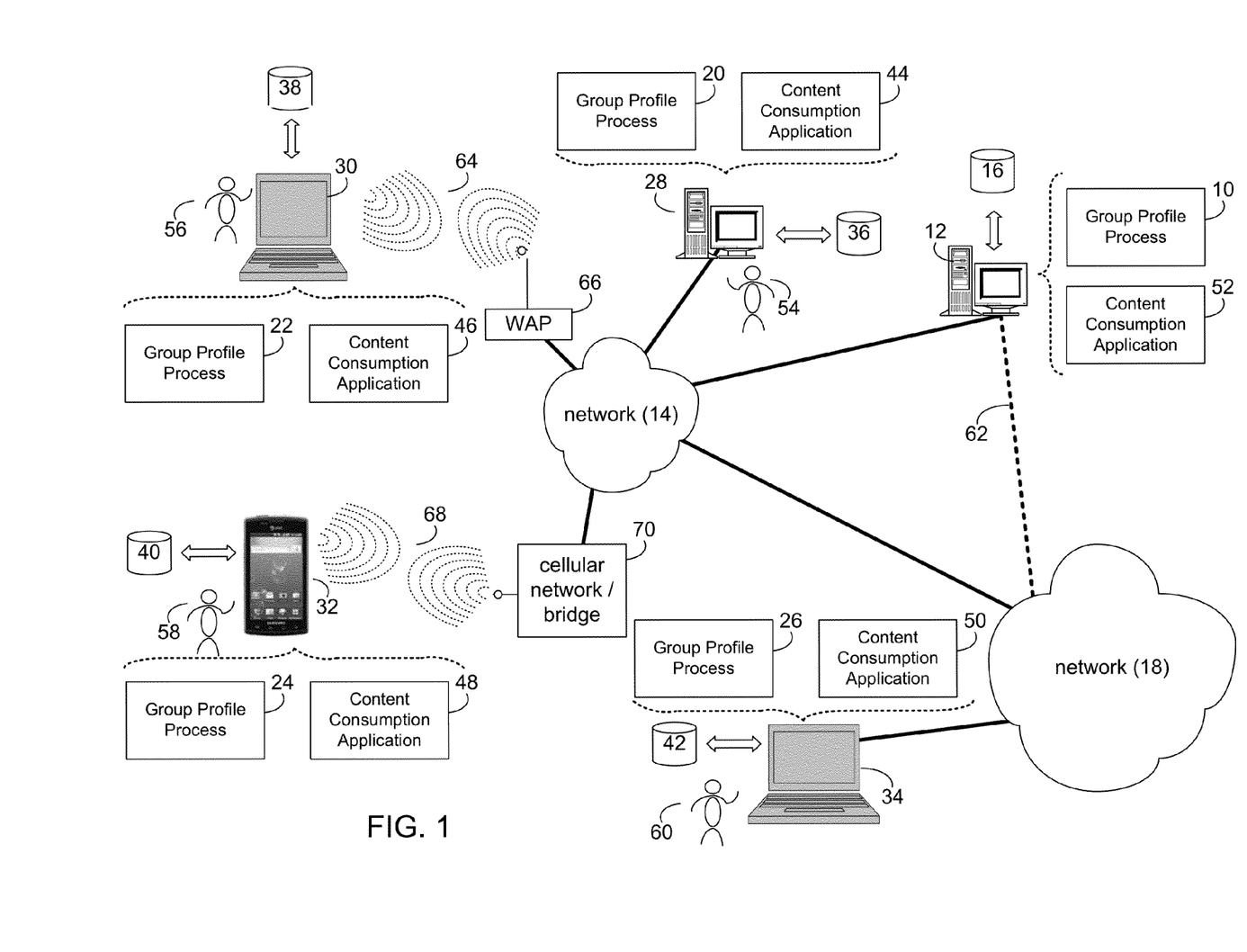
FIG. 1 is a diagrammatic view of a group profile process coupled to a distributed computing network.

Referring now to FIG. 1, a GP process may be coupled to a computer or computer network. For example, server GP process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server GP process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client GP processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CE®, Red Hat® Linux®, or a custom operating system.

The instruction sets and subroutines of client GP processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the GP process may be a server-side process (e.g., which may be implemented via server GP process 10), in which all of the functionality of the GP process may be executed on a server computer (e.g., server computer 12). In an embodiment, the GP process may be a client-side process (e.g., which may be implemented via one or more of client GP processes 20, 22, 24, 26), in which all of the functionality of the GP process may be executed on a client computing device (e.g., one or more of client electronic devices 28, 30, 32, 34). In an embodiment, the GP process may be a hybrid server-client process (e.g., which may be implemented by server GP process 10 and one or more of client GP processes 20, 22, 24, 26), in which at least a portion of the functionality of the GP process may be implemented via server computer 12 and at least a portion of the functionality of the GP process may be implemented via one or more client computing devices (e.g., one or more of client electronic devices 28, 30, 32, 34).

A CCA may operate on a client device (e.g., client CCA 44, operating on client electronic device 28; client CCA 46, operating on client electronic device 30; client CCA 48, operating on client electronic device 32; or client CCA 50, operating on client electronic device 34). A client GP process (e.g., client GP process 20) or a server GP process (e.g., server GP process 10) may be in communication with a client CCA (e.g., client CCA 44) or may be part of a client CCA. Further, in an embodiment a client GP process may include a module and/or component of a client CCA. In such an embodiment at least a portion of the functionality of the GP process may be provided by the client CCA.

A CCA may additionally or alternatively operate on a server device (e.g., server CCA 52, operating on server computer 12 or another server CCA (not shown), operating on another server computer (not shown)). A server GP process (e.g., server GP process 10) or a client GP process (e.g., client GP process 20) may be in communication with a server CCA (e.g., server CCA 52) or may be a part of a server CCA. Further, in an embodiment a server GP process may include a module and/or a component of a server CCA. In such an embodiment at least a portion of the functionality of the GP process may be provided by the server CCA.

Users 54, 56, 58, 60 may access a GP process in various ways. For example, these users may access server GP process 10 directly through the device on which a client process (e.g., client GP processes 20, 22, 24, 26) is executed, namely client electronic devices 28, 30, 32, 34. Users 54, 56, 58, 60 may access server GP process 10 directly through network 14 and/or through secondary network 18. Further, server computer 12 (i.e., the computer that executes server GP process 10) may be connected to network 14 through secondary network 18, as illustrated with phantom link line 62. Users 54, 56, 58, 60 may also access a client or server CCA in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client GP process 20 will be described for illustrative purposes. It will be understood that client GP process 20 may, for example, interact and/or communicate with a server GP process such as server GP process 10 and/or may be executed within one or more applications that allow for communication with other server and/or client GP processes. GP process 20 may be utilized as part of or in conjunction with a variety of server and/or client CCA applications, such as client CCA 44 or server CCA 52. In certain embodiments GP process 20 may be utilized as part of or in conjunction with a variety of other consumption applications and/or communication applications (not shown), facilitating consumption of content and/or communication among individuals and/or groups. This is not intended to be a limitation of this disclosure, as other configurations are possible. For example, some implementations may include one or more of client GP processes 22, 24, 26 or server GP process 10 in place of or in addition to client GP process 20. Additionally/alternatively, GP process 20 may include stand-alone client processes and/or stand-alone server processes, GP process may be utilized as part of or in conjunction with client CCA 46, 48, 50 or another server CCA or other applications (not shown), and so on.

Figure 2:
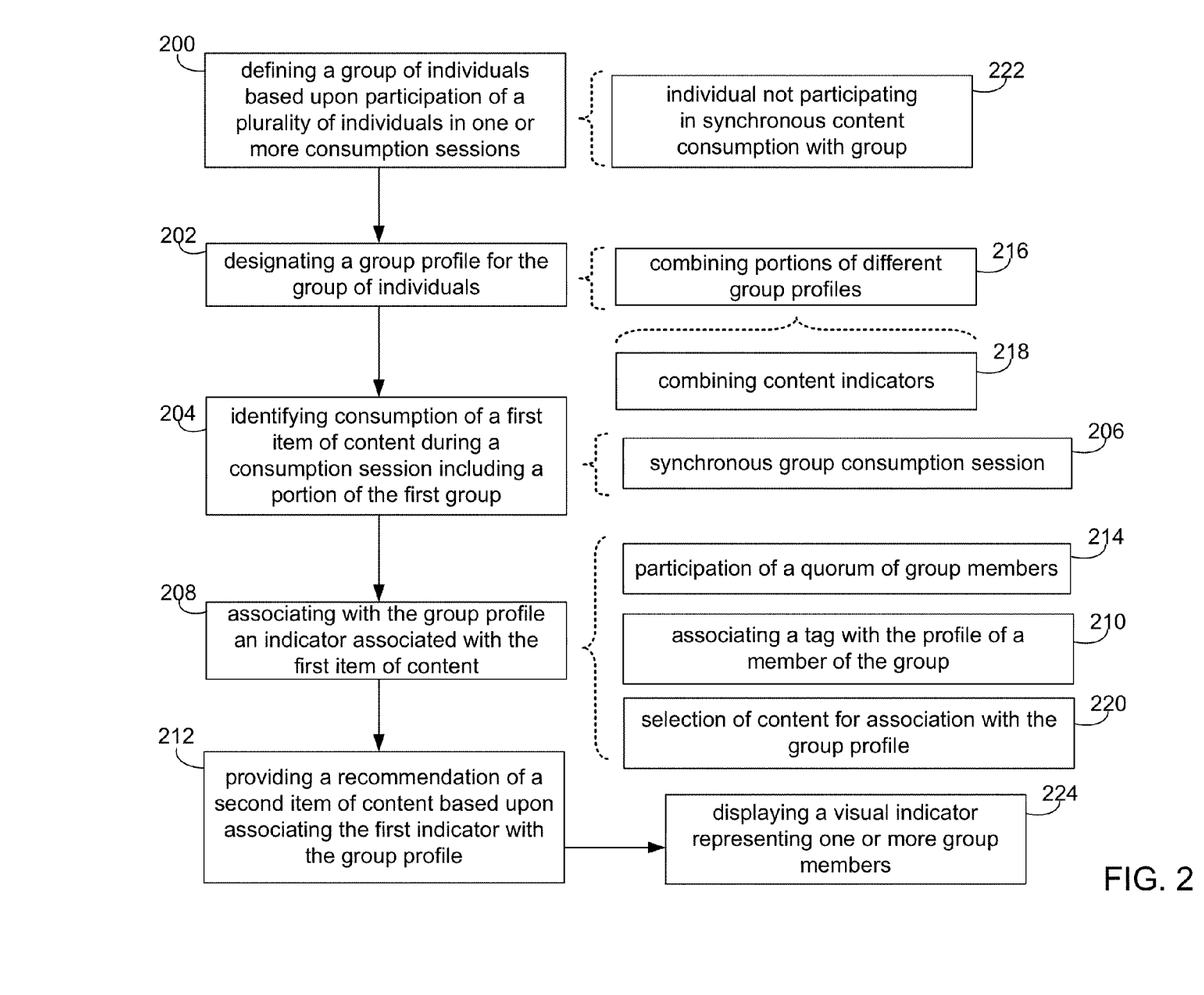
FIG. 2 is a flowchart of a process executed by the group profile process of FIG. 1.

Referring now also to FIG. 2, there is shown a diagrammatic view of an example process that may be implemented by a GP process, e.g., client GP process 20. GP process 20 may define 200 a group including a plurality of individuals. A group may be defined 200 as including one or more individuals and may also include one or more subgroups. GP process 20 may define 200 the group based upon, at least in part participation of the plurality of individuals (and/or of the one or more subgroups) in one or more consumption sessions. For example, several individuals may participate in collective consumption of online content (e.g., online video content) through a CCA (e.g., CCA 52). For example, the individuals may participate in a consumption session in which the individuals each view a variety of online videos in a synchronous manner. Based on this synchronous consumption by the individuals, GP process 20 may define 200 a group to include those individuals. For example, the individuals may each consume the same piece of content (e.g., an online video) using respective computing devices associated with each of the individuals. In one such example, each of the several individuals may access the same content distribution site or application (e.g., CCA 42) at the same, or nearly the same general time frame and consume (e.g., watch, view, listen to, read, etc.) the content via the distribution site or application.

In certain embodiments, GP process 20 may define 200 a group to include certain individuals even though those individuals may not have consumed any content as a group. As such, GP process 20 may define 200 the group based on the common online interaction session between and/or including the plurality of individuals. For example, in certain embodiments GP process 20 may define 200 a group based on a plurality of individuals participating in an online communication session (e.g., a video chat session including the plurality of individuals) in which no consumption of content (other than the video chat) has occurred. In certain embodiments, GP process 20 may define 200 a group based on a shared affinity among a plurality of individuals. For example, GP process 20 may define 200 a group to include a plurality of individuals who have indicated an interest in certain subject matter, certain online content, certain other affinity groups, and so on. In certain embodiments, GP process 20 may define 200 a group to include certain individuals who have collectively consumed online content as well as other individuals who have not collectively consumed online content. For example, a group of friends (as determined, for example, through social network analysis, address book information, and so on) may include a sub-group of friends who have engaged in synchronous consumption of content with each other and a sub-group of friends who have not engaged in synchronous consumption of content with each other. In such case, GP process 20 may define 200 a group to include, for example, the entire group of friends, only the first sub-group of friends, only the second sub-group of friends, and/or various combinations and sub-combinations of these options. In certain embodiments, defining 200 a group may be based upon identifying individuals based on user accounts, credentials, IP addresses, or other electronic information available to GP process 20 as a result of the individuals accessing various content and/or being affiliated with other individuals.

In certain embodiments, GP process 20 may define 200 a group based on participation by a plurality of individuals in a plurality of consumption (or other) sessions. For example, in certain embodiments GP process 20 may define 200 a group to include a number of individuals only after those individuals have participating together in two or more consumption sessions, i.e., may not define 200 the group based on the same individuals participating together in only a single consumption session. In this way, in certain embodiments, GP process 20 may define 200 groups exhibiting the characteristic that their members meet on multiple occasions and may thereby sometimes avoid defining groups including only ad hoc (or other temporary) associations of individuals.

In certain embodiments, GP process 20 may define 200 a group based on participation by portions of the group in a plurality of consumption sessions. For example a first consumption session may include users 54, 56 and 58 and a second consumption session may include users 56, 58 and 60. GP process 20 may define 200 a variety of groups based on these two consumption sessions. In certain embodiments, based on the above consumption sessions, GP process 20 may define 200 a group to include users 56 and 58 because those users represent the intersection of the attendees of the two consumption sessions. In certain embodiments, based on the above consumption sessions, GP process 20 may define 200 a group to include users 54, 56, 58, and 60 because those users represent the union of the attendees of the two overlapping consumption sessions.

Continuing the above example, in certain embodiments, GP process may define 200 a variety of other groups based additionally/alternatively on other information including, for example, the social (or other) connections between participants in the two consumption sessions. For example, GP process 20 may define 200 a group to include users 54, 56, and 60 based on the participation of user 56 in both consumption sessions and the information that users 54 and 60 share strong social networking connections with user 56 while user 58 has no social networking connections with user 54 and only weak social networking connections with user 56 and 60.

In certain embodiments, GP process 20 may define 200 a group based on selection of group members by one or more group members or other users or administrators (e.g., based on a selection made via a user input). For example, in certain embodiments, GP process 20 may define a portion of a group based on selection by one or more individuals of one or more other individuals to be included in the group. For example, based on members of an existing group selecting additional individuals to be added to the group, GP process 20 may define 200 the group to also include the additional individuals. In certain embodiments, non-group members may select individuals to be added to a group. For example, based on an administrator or other individual selecting certain individuals for inclusion in a group, GP process 20 may define 200 a group as including those selected individuals.

GP process 20 may designate 202 a group profile for the group of individuals. For example, GP process 20 may designate 202 a group profile for the group based on defining 200 a group of individuals. In certain embodiments, GP process 20 may designate 202 a group profile by associating a designating identifier (e.g., a name, serial number, or other unique identifier) with a group and/or individual members of the group. In certain embodiments, GP process 20 may designate 202 a group profile by designating a particular tag or label to be associated with the group and/or individual members of the group.

GP process 20 may identify 204 consumption of a first item of content by a portion of the group during a consumption session. The first item of content may include a variety of online (and/or offline) content, including video clips, music and other audio segments, text passages, web pages, images, multimedia presentations, and so on. The content may be consumed by a portion of the group (e.g., a number of individuals in the group or the entire group) in a variety of ways. For example, the portion of the group may consume the content in a synchronous consumption session 206 using a CCA. For example, a portion of the group may participate in a video-enabled chat session in which one or more individuals are able to select a video clip to be viewed and commented on by the rest of the group (or a portion thereof) near-simultaneously. As such, GP process 20 may identify 204, based on the selection and/or viewing of the video clip, that a portion of the group has consumed the video.

In certain embodiments GP process 20 may identify 204 consumption of content by the entire group. For example, GP process 20 may identify 204 consumption of various multimedia content during a synchronous (or near-synchronous) communication session including the entirety of the group (e.g., synchronous communication session 206). In certain embodiments GP process 20 may identify 204 consumption of content by only a fraction of the group. For example, GP process 20 may identify 204 consumption of certain content by one or more group members, wherein the consumption occurs on an individual basis or as part of a communication session involving only a fraction of the group. For example, one member of a group or a sub-group of a group may sometimes consume content outside the context of a full-group session. Based, for example, on designating 202 a group profile (which may be associated with the individual members as well as/instead of the entire group), GP process 20 may recognize that the one member or sub-group are part of the larger group and thereby identify 204 consumption of content by that one member or sub-group as consumption of content that is relevant to the group as a whole.

GP process 20 may associate 208 with the first group profile an indicator associated with consumed content. For example, continuing the above examples, a portion of a group may participate in a video-enabled chat session in which one or more individuals are able to select a video clip (or other type of content) to be viewed and commented on by the rest of the group (or a portion thereof) near-simultaneously. As such, GP process 20 may associate 208 an indicator associated with the video clip (or other type of content) with the group profile. In this manner, a record may be created that the group (or a portion thereof) has consumed the video clip (or other content) and that the video clip (or other content) may therefore usefully inform recommendations of additional content in which the group may be interested.

An indicator may take a variety of forms. For example, in certain embodiments an indicator may include a tag or metatag that may include information such as the identity of the group, the content viewed, the members of the group viewing the content, the time during which the content was viewed, the number of times the content has been viewed by the group and/or individual members of the group, and so on. In certain embodiments, the indicator may include information associated with a rating or ratings relating to the content. For example, the indicator may include rating information provided by the group (and/or individual members of the group) regarding the content. In certain embodiments, the indicator may include rating information provided by individuals not belonging to the group or provided by other groups. For example, the indicator may include rating information from a group of similar composition to the group associated with the particular group profile or an individual exhibiting a characteristic relevant to the group (e.g., a trusted critic, an individual closely-associated to the group, a former group member, and so on).

In certain embodiments associating 208 an indicator may include associating 210 a tag with a profile of a member of the group. For example, in addition to or as an alternative to associating 208 an indicator with the group profile, GP process 20 may associate 210 a tag associated with the group and/or the content viewed by the group (or a portion thereof) with a social networking (or other) profile of a member of the group. In this way, for example, GP process 20 may facilitate incorporation of the content consumption of the group into the profile of a member of the group and may thereby facilitate providing recommendations to individual members of the group (as well as the group as a whole and/or portions of the group) of additional content that may be of interest.

In certain embodiments, associating 210 a tag with a profile of a member of the group may facilitate GP process 20 designating 202 a group profile without necessarily storing a separate profile specifically associated with the group. That is, for example, GP process 20 may designate a group profile by associating a 210 a tag with each respective member of the group. As such, the group may be defined as individuals having a group designation tag associated 210 with each member's respective profile. In this way, for example, in order to determine a consumption profile associated with a group (or other group information) GP process 20 may refer to the tags that have been associated 210 with the profiles of various members of the group rather than looking up a specific group profile separate from the profiles of the various members. In certain embodiments, therefore, by filtering tags of existing individual profiles for tags associated with a particular group GP process 20 may determine useful information regarding the group without having to designate and/or access a portion of a storage device for various indicators that have been associated 208 specifically with the group instead of with its individual members.

GP process 20 may provide 212 a recommendation of content based upon associating 208 an indicator with the group profile (and/or a profile of an individual associated with the group). GP process 20 may determine relevant content with regard to which a recommendation may be provided 212 in a variety of ways, including analysis of similarity and/or differences between various items of content, analysis of group member preferences, analysis of other individuals' or groups' preferences, and so on. For example, an indicator associated with a group profile may indicate that a portion of the group previously viewed a particular video multiple times, rated the video highly, and spent significant amount of time discussing the video (as determined, for example, by semantic analysis of related chat sessions). In such a case, GP process 20 may determine that certain other content is similar to the previously-viewed video, has been highly recommended by other similar groups, is of similar length and resolution to the previously-viewed video, and so on and may therefore provide 212 a recommendation regarding that other content to the group. GP process 20 may analyze a variety of information and information types to determine recommendations and/or may receive information informing recommendations from other processes or applications. For example, in certain embodiments, GP process 20 may recommend a content created by the same production company, composer, director, may recommend a music clip that exhibits similar characteristics to the video, or may recommend an online article that has been recommended by a separate service to which several group members subscribe. In order to facilitate receiving recommendations and/or information regarding recommendations from other processes or applications GP process 20 may provide information regarding a group including, for example, group composition, previous group consumption activity, and so on, to such other processes or applications. In some embodiments, providing information regarding the group may include providing anonymized information regarding the group.

GP process 20 may provide 212 a recommendation to a group, to a portion of the group, and/or to one or more individual members of the group. For example, continuing the example above, GP process 20 may provide 212 to a group a recommendation regarding certain videos based upon associating 208 indicators relating to similar videos, music and other content with the profile of the group. Additionally/alternatively, GP process 20 may provide 212 a recommendation to a portion of the group (e.g., the portion of the group that has participated most actively in consumption of and/or discussion of similar content) and/or to an individual member of the group (e.g., the individual who initially introduced the video to the group).

GP process 20 may provide 212 a recommendation in a variety of ways. In certain embodiments, GP process 20 may present a group (or a portion thereof) with an interactive list of recommended content. For example, in certain embodiments GP process 20 may display as part of a CCA a list of recommended videos with thumbnail representations of the video content, wherein the full video content may be accessed by a member of the group selecting one of the thumbnails. In certain embodiments, GP process 20 may create or otherwise provide 212 a recommended playlist. For example GP process 20 may add recommended content to a master list (with or without approval from the group) that may be accessed on demand by the group (or a portion thereof) when the group is interested in viewing recommended content. In certain embodiments, GP process 20 may provide 212 other types of recommendation notifications to a group (or a portion thereof). For example, GP process 20 may send a digest email, instant message communication, and so on, indicating that certain content has been recommended for consumption by the group (or a portion thereof).

In certain embodiments, GP process 20 may associate 208 an indicator associated with particular content with a group profile only when a quorum 214 of group members has participated in consuming the content. For example, the full membership of a group may not always be present at all group sessions. Further, in some embodiments it may be desirable to associate with a group profile, for the purposes of providing 212 recommendations, only content that has been consumed by a certain percentage of the group. As such, in certain embodiments GP process 20 may determine whether a particular quorum of group members has participated in a particular consumption session and may associate 208 indicators with the group profile based on consumption in that session only if the quorum is met. For example, if a quorum 214 for a particular group of twenty individuals is 60% of members and only 10 members of the group have participated in a particular synchronous consumption session, GP process 20 may determine that the quorum 214 was not met and may therefore not associate 208 indicators relating to consumption of content at that particular session with the group profile. In this way, for example, recommendations for the group may be tailored to address the tastes of the group as a whole rather than, for example, the tastes of only a small number of members of the group who happened to participate in a specific consumption session. The participation level amounting to a quorum 214 may be determined automatically or may be set by group members, a group administrator, or by other means.

Designating 202 a group profile for a particular group may include combining 216 portions of other group profiles. For example, if a particular new group of twenty-five individuals is participating in a synchronous content consumption session, GP process 20 may determine that many of the individuals forming this new group also share common membership in (or other common characteristics with) certain other groups. For example, fifteen of the twenty-five individuals may belong to one other established group while twenty of the twenty-five individuals may also belong to a different other established group. Accordingly GP process 20 may combine 216 portions of the profiles of these two other groups (including, potentially, the entirety of the other group profiles) as part of designating 202 the group profile for the new group.

In certain embodiments, combining 216 portions of a plurality of group profiles may include combining 218 certain content indicators associated 208 with the plurality of group profiles into a set of content indicators that may be associated 208 with another group profile. Continuing the example above, GP process 20 may combine 218 a set of content indicators from the group of fifteen and a set of content indicators from the group of twenty members into a set of content indicators for the group of twenty-five. In this way, for example, the taste preferences, content consumption history, and other relevant profile information from the group profiles of the smaller groups may inform the new group profile and, potentially, the recommendations provided 212 for that new group profile. This may, for example, result in GP process 20 providing 212 useful and finely tuned recommendations for the new group, based on combined 216 portions of other group profiles, even though the new group may not have consumed a significant amount of content as a group.

In certain embodiments, aspects of the combination process in the examples above may be chronologically reversed. For example, in certain embodiments the group of twenty-five members may predate the existence of the groups of fifteen and twenty individuals. In such a case GP process 20 may still recognize a common membership (or other common characteristic) between the group of twenty-five individuals and the later-formed groups of fifteen and twenty individuals. As such, even though the smaller groups were formed later, GP process 20 may combine 218 sets of content indicators from the later-formed groups to be associated 208 as a set of content indicators for the group of twenty-five individuals.

GP process 20 may associate 208 with a group an indicator associated with certain content based on the selection 220 of that content by a member of the first group (or another individual). As such, in certain embodiments GP process 20 may associate 208 an indicator associated with content that was not viewed by the group during a synchronous (or other) communication session but was instead selected 220 by an individual (or group of individuals) as content that may be of interest (or otherwise relevant) to the group. For example, even though a group member may not currently be participating in a consumption session with her group, she may select 220 content that she thinks the group may be interested in and may thereby cause GP process 20 to associate 208 an indicator associated with that content with the group. For example, the group member may use a mouse or other input device to "drag" content onto an icon representing the group, thereby indicating that she has selected 220 the content as being relevant to the group. Additionally/alternatively, the group member may activate an action button (or other indicator) associated with certain content, which may cause a drop-down menu to appear listing the various groups to which the group member belongs. The group member may then, for example, select a particular group from the list thereby causing GP process 20 to associate 208 an indicator relating to such content with the group profile. In certain embodiments, a group member may select 220 content by consuming the content, even though she consumes the content outside the context of a group session (or a group session meeting quorum 214 requirements, and so on).

In certain embodiments, GP process 20 may define 200 a group to include certain individuals 222 who are not participating (or have not participated) in certain consumption sessions with other members of the group. For example, if GP process 20 defines 200 a group based on a plurality of consumption session, GP process 20 may define 200 the group to include certain individuals that were not present at one or more of the plurality of consumption sessions. In certain embodiments, GP process 20 may define 200 a group to include an individual 222 who has never participated in a consumption session with the other members of the group. For example, a group of friends may regularly participate in synchronous consumption sessions on Friday nights at 7 PM, but may not participate in consumption sessions as a group at any other time. Continuing the example, a close friend of each member of the group may always have to work on Friday nights at 7 PM and therefore is never able to participate in the consumption sessions. However, all of the friends may want to include the working friend in the group for the purposes of providing 212 recommendations that are relevant to all of the friends, including the working friend. As such, GP process 20 may define 200 the group to include not only the friends who participate in the Friday night consumption sessions but also the friend who always has to work on Friday nights. Based on including the working friend in the group, GP process 20 may, for example, identify 204 consumption of content that is relevant to the group based on, for example, both the Friday night consumption session and consumption sessions involving only the working friend. Similarly, GP process 20 may provide 212 recommendations to both the group members present at the Friday night sessions and the working friend, may permit the working friend to select 220 content for association with the group profile, may associate 210 tags with the profile of the working friend, may combine 216 portions of other group profiles including profiles of groups including the working friend, and so on.

In order to define 200 a group, GP process 20 may identify individuals 222 who are not participating (or have not participated) in certain consumption sessions with other members of the group based on various information. For example, in certain embodiments, individuals 222 may be associated a group based on past activity associated with the group (e.g., participation in past consumption sessions with the group). In certain embodiments, one or more members of the group and/or one or more individuals 222 may indicate that one or more individuals 222 should be included in the group. In other words, individuals associated with a group (and others) may designate individuals 222 who should be included by GP process 20 in defining 200 a group. For example, one or more members of a group may indicate to GP process 20 through an input that another individual should be associated with the group, even though that individual may not be participating in a given consumption session.

In certain embodiments, GP process 20 may identify individuals 222 based on social networking connections between those individuals and others. For example, GP process 20 may define 200 a group to include a plurality of individuals and may then determine that certain other individuals are closely associated with one or more of the plurality of individuals through one or more social networks (e.g., have been designated as "close friends," share a determined number of connections, belong to one or more of the same groups, and so on). Based on this information, GP process 20 may further define 200 the group to include one or more of the certain other individuals.

In certain embodiments, GP process 20 may display 224 a visual indicator representing the membership in a group of one or more members of the group. For example, GP process 20 may display 224 such an indicator to a member of a group or another individual in order to indicate a list of individuals who are members of the group. For example, GP process 20 may provide a list of all (or a portion) of the members of a particular group in the form of a "buddy list" or in the form of a text list of various members (and/or the user-names of those members). In certain embodiments, GP process 20 may display 224 icons, photographs, videos, and/or other visual (or multi-media) indicators representing all (or a portion) of the members of a particular group. In certain embodiments, the visual indicator may include a visual indicator associated with profile information of a group member. For example, GP process 20 may display 224, as part of an online profile of an individual, a list of the groups of which an individual is a member and/or may display 224 as part of such an online profile one or more non-text indicators (e.g., an icon, drawing, video, and so on) indicating one or more group memberships. In certain embodiments, GP process 20 may display 224, as part of an online profile of a group, a list (or other indicator) of members of the group. GP process 20 may, for example, display 224 a visual indicator representing group members automatically (e.g., during a group consumption session) or in response to a user input (e.g., hovering a mouse over an icon representing group, activating an action button, and so on).

Figure 3:
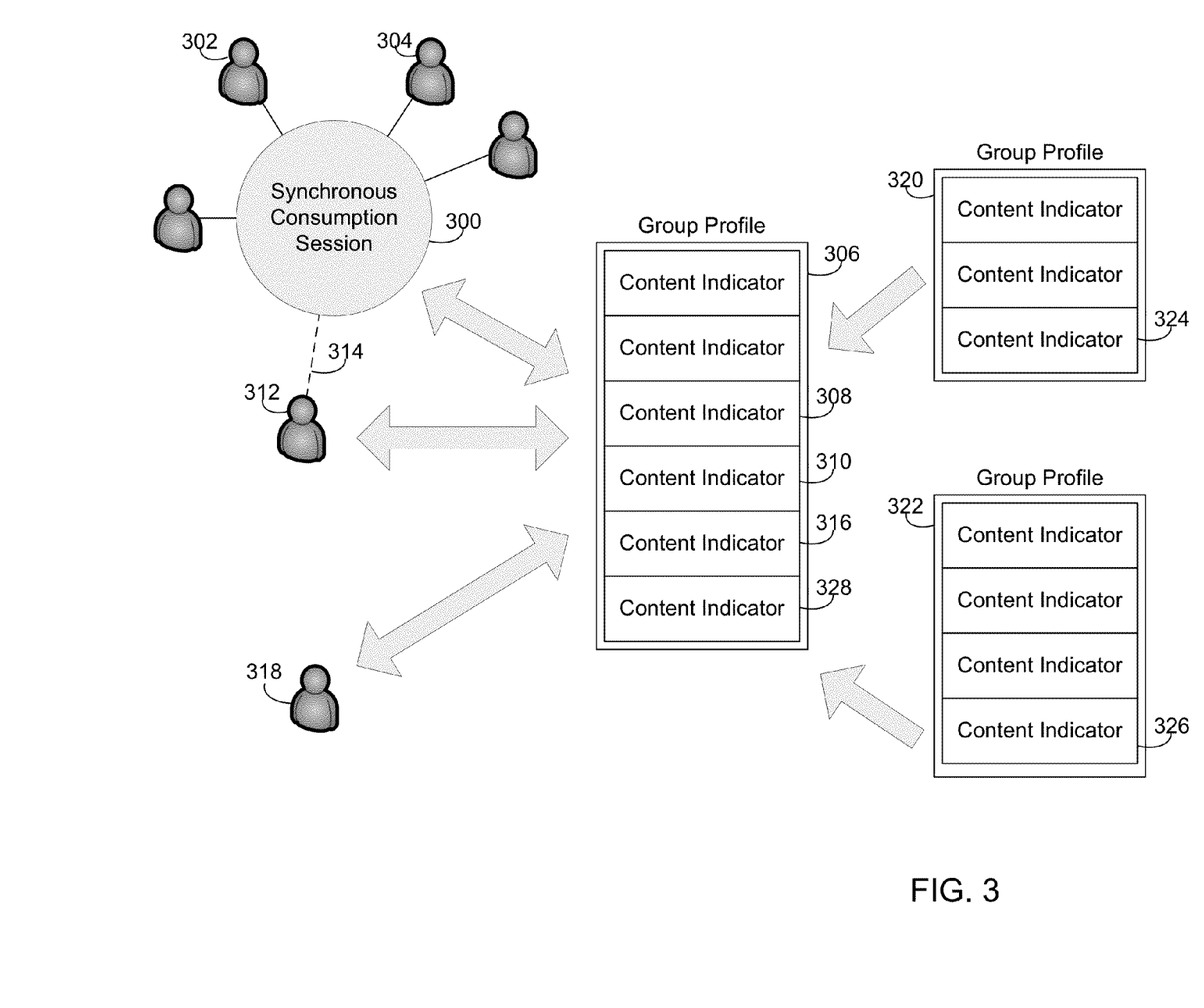
FIG. 3 is a diagrammatic view of an implementation of the group profile process of FIG. 1.

Referring also to FIG. 3, there is shown a diagrammatic view of an aspect of GP process 20. For example, synchronous consumption session 300 may include various individuals, including user 302 and user 304. Based on the participation of these individuals in session 300, GP process 20 may designate 202 group profile 306. As part of session 300, user 302 may select a particular video for the group to view. GP process 20 may accordingly associate 208 content indicator 308, corresponding to the consumed video, with group profile 306. Similarly, user 305 may select a particular online article for consumption and discussion in session 300 and GP process 20 may accordingly associate 208 content indicator 310, corresponding to the consumed article, with group profile 306.

In certain embodiments, user 312 may have participated in session 300, but may have disconnected from the session (as indicated by dotted connection 314). It may still be desirable, however, for user 312 to influence recommendations for the group, and user 312 may therefore select 220 certain content to be associated with group profile 306. As such, for example, GP process 20 may associate 208 content indicator 316, corresponding to the content selected 220 by disconnected user 312, with group profile 306.

In certain embodiments, GP process 20 may define 200 a group to include individuals 222 that are not participating (and/or have not participated) in session 300. For example, user 318 may not have participated in session 330, but may be associated by GP process 20 with group profile 306 based upon, for example, social network connections between user 318 and users 302, 304 and 312. As such, GP process 20 may associate 208 with group profile 306 indicators associated with content selected 220 by user 318 even though user 318 has not participated in session 300.

In certain embodiments, users 302 and 304 may belong to one different group, for which GP process 20 may have designated 202 group profile 320. Further, users 312 and 318 may belong to another different group, for which GP process 20 may have designated 202 group profile 322. As part of designating 202 group profile 306, therefore, GP process 20 may combine 216 portions of group profiles 320 and 322. For example, GP process 20 may determine that content indicator 324 and content indicator 326 are associated with the same content and that the content may be relevant to group profile 306 (e.g., because the content received a high rating from users 302, 304, and 312). Accordingly, GP process 20 may combine 218 the portions of the group profiles 320 and 322 represented by content indicators 324 and 326 in order to associated 208 content indicator 328 with group profile 306, wherein content indicator 328 is associated with the same content as content indicators 324 and 326.

Figure 4:
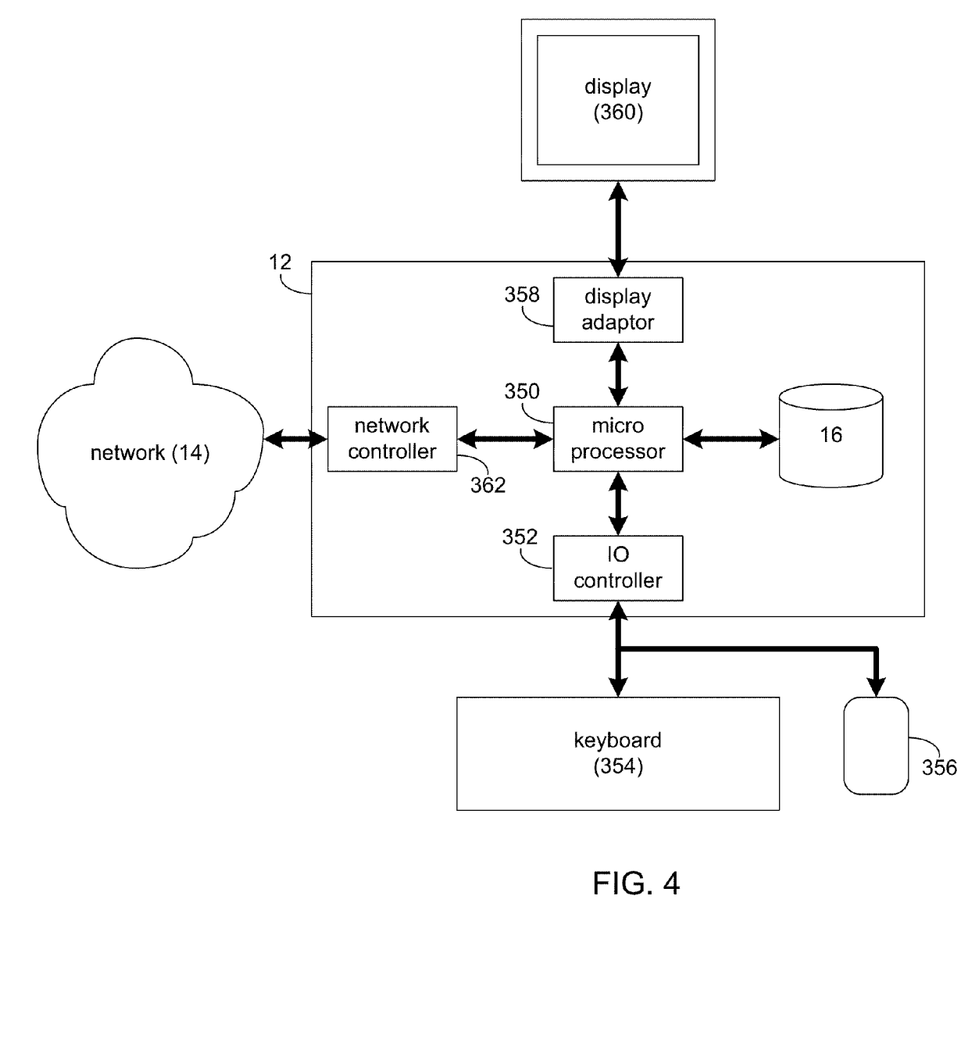
FIG. 4 is a diagrammatic view of a computing system that may execute or be utilized by the group profile process of FIG. 1.

Referring also to FIG. 4, there is shown a diagrammatic view of an example computing system included in server computer 12. While computing system 12 is shown in this figure, this is for illustrative purposes only and is not intended to be a limitation of this disclosure, as other configurations are possible. For example, any computing device capable of executing, in whole or in part, a GP process (e.g., GP process 10, 20, 22, 24, or 26) may be substituted for the computing system 12 within FIG. 4, examples of which may include but are not limited to client electronic devices 28, 30, 32, 34.

Computing system 12a may include microprocessor 350 configured to e.g., process data and execute instructions/code for group profile process 10. Microprocessor 350 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. IO controller 352 may be configured to couple microprocessor 350 with various devices, such as keyboard 354, mouse 356, USB ports (not shown), and printer ports (not shown). Display adaptor 358 may be configured to couple display 360 (e.g., a CRT or LCD monitor) with microprocessor 350, while network adapter 362 (e.g., an Ethernet adapter) may be configured to couple microprocessor 350 to network 14 (e.g., the Internet or a local area network).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer-implemented method comprising:
    defining, by one or more computing devices, a first group including a plurality of individuals, based upon, at least in part, participation of the plurality of individuals in one or more first synchronous group consumption sessions, wherein each of the plurality of individuals simultaneously access, via their respective computing devices, one or more first content items during each first synchronous group consumption session;
    designating, by the one or more computing devices, a first group profile for the first group;
    identifying, by the one or more computing devices, consumption of a second content item by a portion of the first group, via their respective computing devices, during a second synchronous group consumption session participated in by the portion of the first group;
    associating with the first group profile, by the one or more computing devices, a first indicator associated with the second content item consumed by the portion of the first group during the second synchronous group consumption session; and
    providing, by the one or more computing devices, a recommendation of a third content item to at least one of the plurality of individuals in the first group, wherein the recommendation is based upon, at least in part, associating with the first group profile the first indicator associated with the second content item.

2. The computer-implemented method of claim 1 wherein the first indicator is associated with the first group profile based upon, at least in part, a quorum of the plurality of individuals of the first group participating, via their respective computing devices, in the second synchronous group consumption session.

3. The computer-implemented method of claim 1 wherein associating the first indicator with the first group profile comprises:
    associating one or more tags associated with the first group and the second content item with a profile of one of the plurality of individuals of the first group.

4. The computer-implemented method of claim 1 wherein designating the first group profile for the first group comprises:
    combining a portion of a second group profile associated with a first subset of individuals of the first group and a portion of a third group profile associated with a second subset of individuals of the first group.

5. The computer-implemented method of claim 4 wherein combining the portion of a second group profile and the portion of a third group profile comprises:
    combining a portion of a first set of content indicators associated with the second group profile and a portion of a second set of content indicators associated with the third group profile.

6. The computer-implemented method of claim 1 further comprising:
  associating with the first group profile, by the one or more computing devices, a second indicator associated with a fourth content item, wherein associating the second indicator with the first group profile is based upon, at least in part, a selection of the fourth content item, by one of the plurality of individuals of the first group, for association with the first group profile.

7. The computer-implemented method of claim 1 wherein defining the first group further comprises:
  defining the first group based upon, at least in part, participation by the plurality of individuals, via their respective computing devices, in a plurality of first synchronous group consumption sessions.

8. A computer program product residing on a non-transitory computer readable medium having a plurality of instructions stored thereon, which, when executed by a processor, cause the processor to perform operations comprising:
  defining a first group including a plurality of individuals, based upon, at least in part, participation of the plurality of individuals in one or more first synchronous group consumption sessions, wherein each of the plurality of individuals simultaneously access, via their respective computing devices, one or more first content items during each first synchronous group consumption session;
  designating a first group profile for the first group;
  identifying consumption of a second content item by a portion of the first group, via their respective computing devices, during a second synchronous group consumption session participated in by the portion of the first group;
  associating with the first group profile a first indicator associated with the second content item consumed by the portion of the first group during the second synchronous group consumption session; and
  providing to at least one of the plurality of individuals of the first group a recommendation of a third content item, wherein the recommendation is based upon, at least in part, associating with the first group profile the first indicator associated with the second content item.

9. The computer program product of claim 8 wherein the first indicator is associated with the first group profile based upon, at least in part, a quorum of the plurality of individuals of the first group participating, via their respective computing devices, in the second synchronous group consumption session.

10. The computer program product of claim 8 wherein associating the first indicator with the first group profile comprises:
  associating one or more tags associated with the first group and the second content item with a profile of one of the plurality of individuals of the first group.

11. The computer program product of claim 8 wherein designating the first group profile for the first group comprises:
  combining a portion of a second group profile associated with a first subset of individuals of the first group and a portion of a third group profile associated with a second subset of individuals of the first group.

12. The computer program product of claim 11 wherein combining the portion of a second group profile and the portion of a third group profile comprises:
  combining a portion of a first set of content indicators associated with the second group profile and a portion of a second set of content indicators associated with the third group profile.

13. The computer program product of claim 8 wherein the operations further comprise:
  associating with the first group profile a second indicator associated with a fourth content item, wherein associating the second indicator with the first group profile is based upon, at least in part, a selection of the fourth content item, by one of the plurality of individuals of the first group, for association with the first group profile.

14. The computer program product of claim 8 wherein defining the first group further comprises:
  defining the first group based upon, at least in part, participation by the plurality of individuals, via their respective computing devices, in a plurality of first synchronous group consumption sessions.

15. The computer-implemented method of claim 1, wherein each synchronous group communication session is a group communication session during which the plurality of individuals, via their respective computing devices, communicate at least one of audio and video information to each other in real-time during consumption of a particular content item.

16. The computer program product of claim 8, wherein each synchronous group communication session is a group communication session during which the plurality of individuals, via their respective computing devices, communicate at least one of audio and video information to each other in real-time during consumption of a particular content item.

17. A computing system having one or more processors configured to perform operations comprising:
  detecting a first participation, by a plurality of computing devices associated with a plurality of users, in a first real-time group communication session;
  in response to detecting the first participation, detecting a first consumption, by the plurality of computing devices, of a first media item during the first real-time group communication session;
  in response to detecting the first consumption, forming a group profile and associating with the group profile (i) profiles for each of the plurality of users and (ii) a first indicator of the first media item; and
  based on the first indicator of the group profile, providing a recommendation of a second media item to at least one of the plurality of computing devices.

18. The computing system of claim 17, wherein the operations further comprise:
  detecting a second participation, by a subset of the plurality of computing devices, in a second real-time group communication session;
  in response to detecting the second participation, detecting a second consumption, by the subset of the plurality of computing devices, of a third media item during the second real-time group communication session;
  in response to detecting the second consumption, associating a second indicator of the third media item with the group profile to obtain a modified group profile; and
  in response to obtaining the modified group profile, providing a recommendation for the third media item to at least one of a remainder of the plurality of computing devices that are not in the subset of the plurality of computing devices.

19. The computing system of claim 17, wherein the operations further comprise:
  detecting a second participation, by a portion of the plurality of computing devices, in a second real-time group communication session;
  in response to detecting the second participation, detecting a second consumption, by the portion of the plurality of computing devices, of a third media item during the second real-time group communication session;

in response to detecting the second consumption, associating a second indicator of the third media item with the group profile to obtain a modified group profile; and based on the modified group profile, providing a recommendation for a fourth media item to at least one of the plurality of computing devices.

20. The computing system of claim 17, wherein forming the group profile is performed in response to (i) detecting a plurality of first real-time group communication sessions and (ii) detecting consumption, by the plurality of computing devices, of one or more first media items during the first real-time group communication sessions.

* * * * *